April 6, 1965    D. K. MORRISON ETAL    3,176,654
MILKING DEVICE

Filed Feb. 21, 1962    2 Sheets-Sheet 1

INVENTORS
DAVID K. MORRISON
FRANK H. ERDMAN
BY
ATTORNEYS

April 6, 1965   D. K. MORRISON ETAL   3,176,654
MILKING DEVICE
Filed Feb. 21, 1962   2 Sheets-Sheet 2
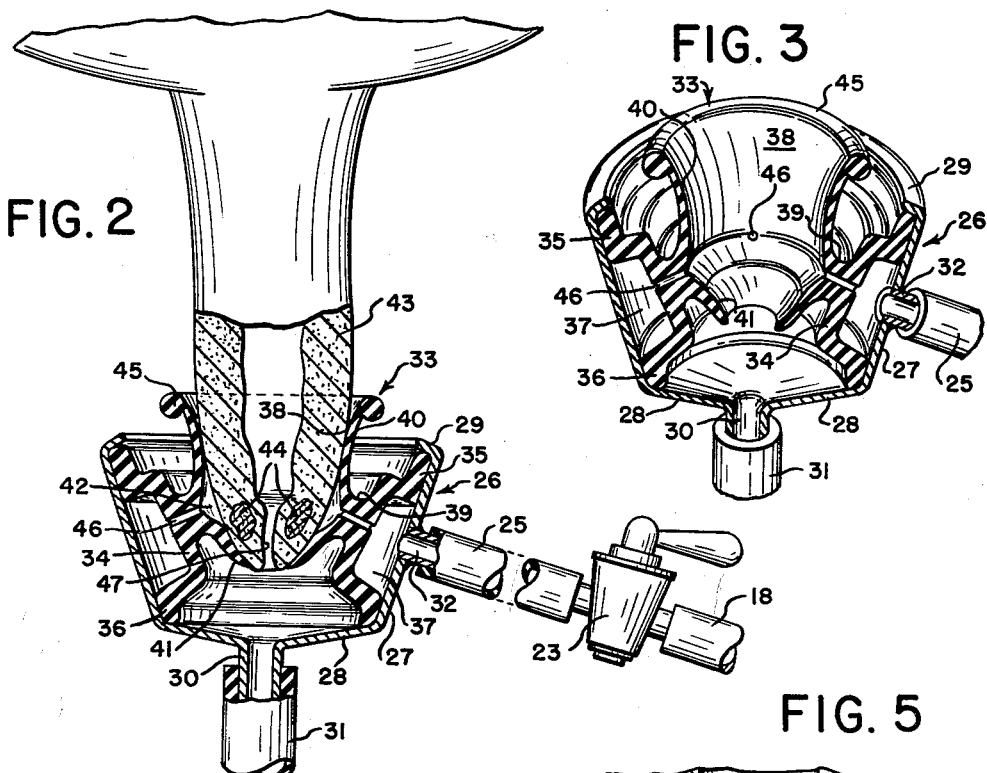
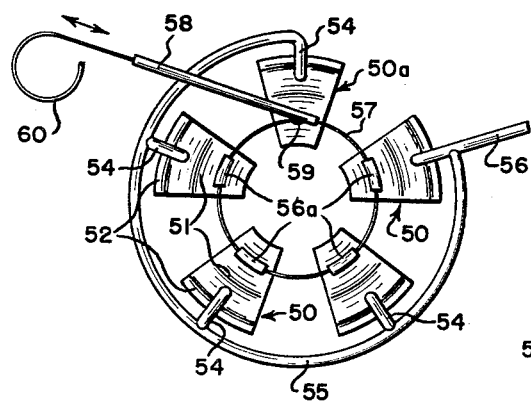
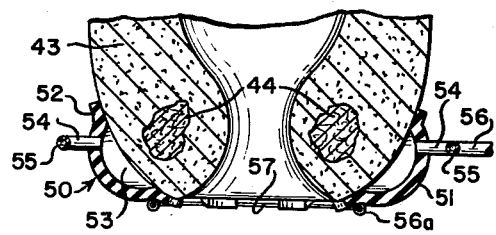
INVENTORS
DAVID K. MORRISON
FRANK H. ERDMAN
BY
ATTORNEYS United States Patent Office 3,176,654
Patented Apr. 6, 1965

3,176,654
MILKING DEVICE
David K. Morrison, Miami, and Frank H. Erdman, Fort Lauderdale, Fla., assignors to U. S. Industries, Inc., New York, N.Y., a corporation of Delaware
Filed Feb. 21, 1962, Ser. No. 174,848
15 Claims. (Cl. 119—14.01)

The present invention relates to the field of automatic milking equipment, and more particularly to a novel, improved and simplified device for application to the teat of a cow to effect the efficient release of milk therefrom.

In conventional automatic milking apparatus, connection to the teats of the cow usually is established by means of assemblies, each comprised of a shell of generally cylindrical form and a resilient "inflation," which substantially fully envelopes the teats. Extraction of the milk usually is effected by applying a pulsating vacuum to the interior of the inflation and a constant vacuum to the lower or outlet end of the assembly. The pulsating vacuum causes the inflation to expand and contract, imitating, to a degree, the natural sucking action of a calf, and the constant vacuum assists in releasing the milk and conveying it away to a suitable receptacle.

Notwithstanding the extraordinary efforts that have been devoted to the design of inflation and shell assemblies of the general conventional type referred to above, substantial problems still are encountered in the operation of milking equipment incorporating these assemblies. By way of example only, one of the more serious difficulties experienced results from a tendency of the conventional inflation and shell assembly to "ride" upward along the teat, under the combined influence of alternate expansion and contraction of the inflation and of the constantly applied vacuum tending to draw the teat into the assembly. If the inflation and shell assembly is caused or enabled to ride upward to an excessive degree (which actually is a very short distance) the upper end of the assembly will surround very delicate valve tissue at the base of the teat. At best, this condition will cause the valve to be closed, preventing or seriously impeding the release of milk from the cow's udder. And, not infrequently, permanent damage is caused to the valve tissue.

In accordance with the present invention, a significantly improved milking attachment is provided which is applied to the lower end only of the teat, to effect the release of milk from the cow, and which cannot reach the delicate valve mechanism near the base of the teat to cause closure thereof or damage thereto. More specifically, the novel and improved device of the invention is so shaped and proportioned as to be received over the lower end extremity of the teat, surrounding the teat in the area of the sphincter muscle. The attachment grips the lower end of the teat by suction and then is caused to expand radially to dilate the sphincter muscle and open the milk canal, enabling a free release of the milk.

With the new attachment, an efficient release of the milk can be realized without the application of vacuum to the milk canal. However, it may be desirable to apply such a vacuum in certain instances, particularly in completely closed milking systems, for example, where the extracted milk is piped directly from the cow to a central collecting vessel. Further, the new attachment advantageously operates with a continuous suction or vacuum, applied to grip the lower end of the teat, which enables the usual pulsating control—often an expensive, complicated and troublesome device—to be dispensed with.

In one specific, advantageous, form of the invention there is provided a resilient, radially expandable sleeve which is mounted in a funnel-like cup. The sleeve, when assembled with the cup, forms inner and outer vacuum chambers. The inner chamber, which may be a single, annular chamber or a plurality of suction "pockets" arranged in circular configuration, is adapted to engage the outer wall of the teat, in the region generally surrounding the sphincter muscle. The outer vacuum chamber surrounds the inner chamber and has air passages communicating therewith. The outer chamber also is in communication with a vacuum "source" (i.e., an evacuating pump). The inner chamber normally is open but is closed off upon application of the attachment to the teat and, with vacuum applied, the appliance grips the outer wall of the teat firmly. When the inner chamber is closed and evacuated, the outer chamber, which is connected in series between the inner chamber and the vacuum source, is also evacuated and causes radial expansion of the sleeve. However, evacuation of the chamber depends upon the prior sealing of the inner chamber by contact with the teat wall, so that radial expansion of the sleeve is conditioned upon firm engagement of the sleeve with the teat.

In a second specific, advantageous form of the invention a plurality of suction pockets, arranged in circular configuration, are adapted to be engaged with the lower end of the teat, in the region of the sphincter muscle, and a simplified mechanical arrangement, adapted for convenient manual operation, is provided to effect radial expansion of the suction pocket configuration to dilate the sphincter muscle and effect release of the milk. Other specific forms of the invention may, of course, be achieved by following the basic teachings of the invention.

For a better understanding of the invention, reference should be made to the following detailed description and to the accompanying drawing, in which:

FIG. 2 is an enlarged cross sectional view of one advantageous form of the milking attachment according to the invention;

FIG. 3 is a cross sectional, perspective view of the milking attachment of FIG. 2;

FIG. 4 is a bottom plan view of a second advantageous form of milking attachment made according to the invention;

FIG. 5 is a cross sectional view of the milking attachment of FIG. 4, illustrating the manner of applying the attachment to the teat of a cow; and FIG. 6 is a cross sectional view similar to FIG. 5, illustrating the attachment after radial expansion of the vacuum pocket configuration thereof to open the sphincter muscle.

Figure 1:
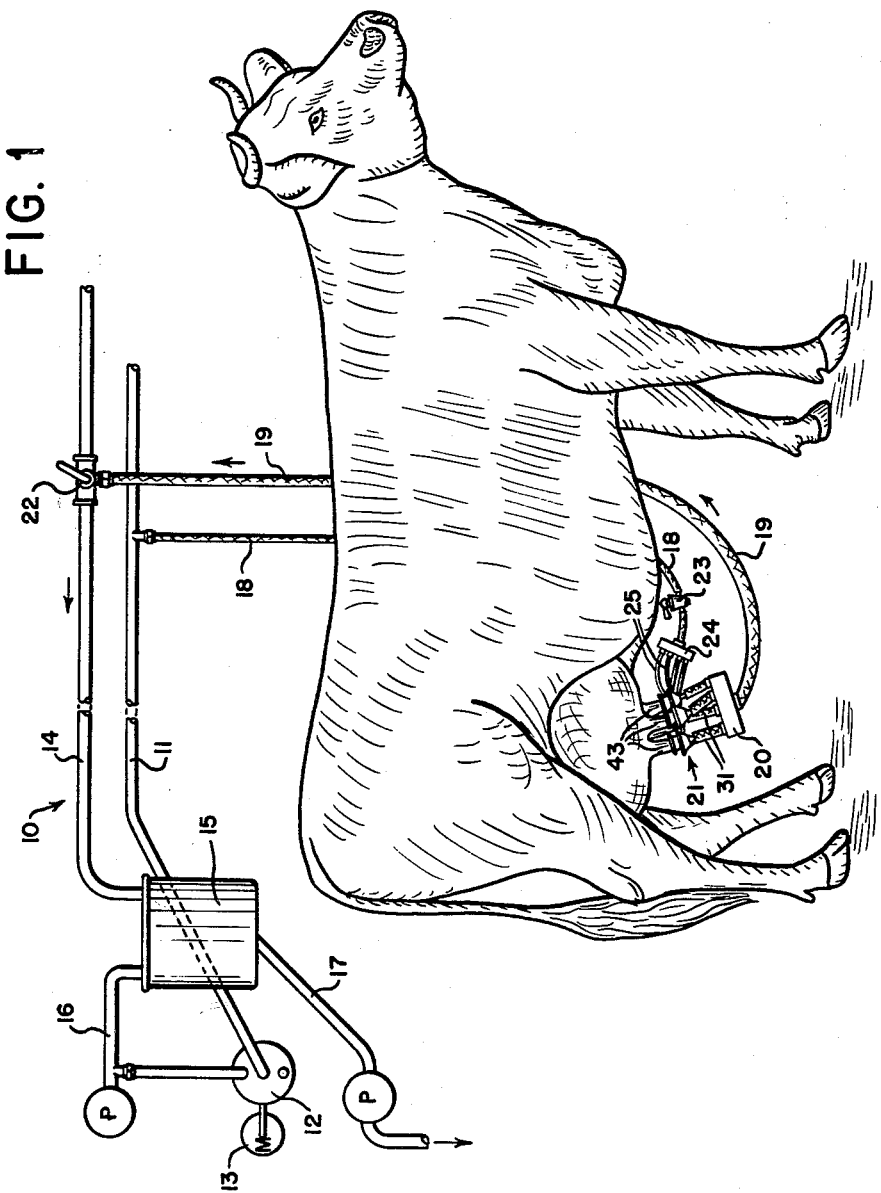
FIG. 1 is a schematic representation of a typical automatic milking system incorporating the improvements of the invention.

Referring now to the drawing, and initially to FIGS. 1-3 thereof, the reference numeral 10 designates, generally, a closed, automatic milking system. The system includes a primary vacuum line 11 connected to a vacuum pump 12 driven by a motor 13. A primary milk return line 14 is also connected to the vacuum pump 12 through a separator 15, the separator being arranged to discharge air and milk separately through lines 16, 17, respectively.

At various milking stalls in the system, flexible hoses 18, 19 are connected to the primary vacuum and milk return lines 11, 14. The milk return hose 19 is connected to a suitable collector 20, which serves, in effect, as a header for four teat cup assemblies 21, and a valve 22 is provided to isolate the milk hose from the primary milk return line. The vacuum hose 18 is connected through a suitable control valve 23 to a header 24, from which individual vacuum hoses 25 extend to the individual teat cup assemblies 21.

The foregoing system, which is exemplary, is more or less conventional except that, in the usual case, a pulsating control is provided in the header 24, for example, so that vacuum and atmospheric pressure alternately are applied to the inflations of conventional inflation and shell assemblies.

In accordance with the present invention, the usual inflation and shell assemblies are replaced by novel and improved teat cup assemblies or attachments. A first advantageous form of the improved attachment, shown in FIGS. 2 and 3, comprises a funnel-like cup 26, advantageously formed of a substantially inert material, such as stainless steel. The cup 26 has downwardly converging side walls 27, a dished bottom wall 28 and an inturned annular lip 29 at the top. A short nipple 30 extends from the bottom of the cup for connection with an individual milk hose 31 which, in turn, is connected to the milk hose 19 through the collector 20. A second nipple 32 extends from the converging side wall 27 of the cup, for connection with an individual vacuum hose 25.

Mounted within the cup 26 is a sleeve 33, formed of a resilient material, such as rubber. The sleeve 33 advantageously is of molded construction and is formed of generally H-shaped cross section to provide an intermediate wall 34 and sealing flanges 35, 36 at the upper and lower ends of the wall. The sealing flanges are so shaped and proportioned that the lower flange bears against the bottom and side walls 28, 27 of the cup, while the upper flange bears against the side wall 27 and the inturned annular lip 29. The sleeve 33 thus is lockingly positioned within the cup but, due to the resiliency of the sleeve material, is readily removable and replaceable for cleaning purposes.

As shown clearly in FIG. 2, the sleeve wall 34 and flanges 35, 36 are so shaped and proportioned, with respect to the side wall 27 of the cup, that an annular chamber 37 is formed about the sleeve wall. The chamber 37, descriptively referred herein as the outer chamber, is in communication with the vacuum source through the nipple 32, hose 25, etc.

Radially inside of the intermediate wall 34 is an inner wall 38, which advantageously is connected to the intermediate wall only by a central annular web section 39, so that the upper and lower portions 40, 41 of the wall are relatively thin and flexible. In the specific form of the invention illustrated in FIGS. 2 and 3, the inner wall 38 of the sleeve defines part of a "chamber" 42, which is of annular form. This "chamber," descriptively referred to herein as the inner chamber, may, in appropriate cases, be a series of pockets arranged in annular configuration, rather than a continuous chamber.

In accordance with the invention, the inner wall 38 of the resilient sleeve is shaped and proportioned to be received over the lower end extremity of the teat 43 of a cow, to surround the immediate area of the sphincter muscle, illustratively designated by the reference numeral 44. The lower portion 41 of the inner wall advantageously converges inwardly and serves, in partial effect, as a bottom flange to limit the extent to which the sleeve may be applied to the teat. And the upper portion 40 of the wall advantageously is provided with a guide flange 45 to facilitate application of the device.

As indicated in FIG. 2, when the device is applied to the teat of a cow, the inner wall 38 of the sleeve cooperates with the outer wall of the teat to seal the inner chamber 42. This chamber, which communicates in series with the outer chamber 37 and the vacuum source through one or more passages 46, may be evacuated by opening of the valve 23, such that a firm grip is established between the sleeve 33 and the sphincter muscle areas of the teat.

When vacuum is established in the inner chamber 42, it also is established in the outer chamber 37, which is in series with the outer chamber. Accordingly, simultaneously with effecting a suction grip upon the teat, the sleeve is caused to expand radially, by radially outward force upon the intermediate wall 34, resulting from the vacuum within the outer chamber 37. The described action is such that substantial radially outward force is applied to the sphincter muscle area of the teat, to dilate the muscle and open the outlet canal 47 thereof. Milk then will flow by gravity from the teat, into the lower portion of the cup 26, from which it drains through the outlet nipple 30 and hose 31. Where appropriate, however, and particularly where the new attachment is incorporated into a closed system, vacuum may be applied to the milk lines to expedite the discharge of milk by the cow and to effect conveyance of the milk to a collection vessel.

In the form of the invention shown in FIGS. 4-6, there are provided a plurality of individual suction elements 50, which advantageously are formed of an inert material, such as stainless steel. Each of the suction elements is shaped to provide a dished-out central area 51 and a continuous peripheral flange 52. Accordingly, when the element is placed in contact with the wall of a teat, as illustrated in FIG. 5, for example, a sealed chamber 53 is formed. Further, each suction element has a small vacuum line 54 connected thereto in its central area 51 to accommodate the withdrawal of air from the region of the chamber 53.

A header line 55 connects each of the vacuum lines 54 and has a nipple 56 at one end by which connection is made to one of the individual vacuum lines (25, in FIG. 1). This enables vacuum to be applied to all of the elements simultaneously.

Attached to the bottom surface of each of the suction elements 50 (with the exception of one element 50a) is a short tubular guide 56a, which receives a length of spring wire 57. The several guides 56a are arranged in generally circular configuration, and the inner end section of the spring wire is of circular form, to engage all of the elements 50 and, in cooperation with the generally circular header, which is formed of relatively flexible material, to hold the suction elements in a generally radial array.

The suction element 50a has attached to its bottom surface an elongated tubular guide 58 which slidably receives an outer end section of the spring wire 57. The inner end extremity of the spring wire is affixed to the elongated guide, as at 59, and the outer end extremity of the wire projects beyond the end of the elongated tubular guide and terminates in a loop 60 or the like to facilitate manual engagement of the wire.

When the outer end of the spring wire is pushed inward with respect to the elongated guide 58, the circular portion of the wire, beyond the inner end of the guide, increases in length and hence the diameter of the circular configuration of the suction elements. Likewise, drawing outward on the end of the spring wire causes the circular configuration of the suction elements to be decreased in diameter.

The principle of operation of the device of FIGS. 4-6 is apparent upon comparison of FIGS. 5 and 6. FIG. 5 illustrated the device upon its initial application to the end extremity of the teat of a cow. The radially dispersed suction elements, inclined upward and outward, are applied about the sphincter muscle area of the teat, and the spring wire 57 is adjusted manually to establish firm contact between the suction elements and the teat. Thereupon, the suction chambers 53 are evacuated, so that the sphincter muscle area of the teat is firmly gripped. Opening of the teat canal is then effected by manual manipulation of the spring wire, to slide the outer portion through the elongated guide and expand the circular configuration of the suction elements.

As in the case of the embodiment of FIGS. 2 and 3, milk will drain from the opened teat canal by gravity.

However, vacuum assistance may be employed where appropriate or desirable.

Advantageously, the form of the invention shown in FIGS. 4–6 will include an appropriate cup to receive the draining milk. The cup would not have an active function in the extraction of the milk, however, unless vacuum assistance were employed.

The invention, in either of its illustrated forms, or in any of its possible further modifications, represents a significant improvement in milking system teat attachments. The improved operation of the device is particularly important, in that the device is applied only to the sphincter muscle area of the teat and cannot close or damage the delicate valve tissue at the base of the teat. Moreover, the operation of the improved device is such that pulsating vacuum control mechanisms, which usually are costly, and complicated and frequently are troublesome, may be dispensed with.

Another significant advantage of the new device resides in its compactness and essential simplicity. These attributes greatly facilitate the important task of cleaning the device, which must be attended to after each occasion of use, and also facilitate the necessary handling and storage of the equipment.

It should be understood, of course, that the specific forms of the invention herein illustrated and described are intended to be representative only, since certain changes may be made therein without departing from the clear teachings of the invention. Accordingly, reference should be made to the following appended claims in determining the full scope of the invention.

We claim:

1. A teat cup attachment for a milking system, comprising suction chamber means arranged in generally circular configuration and shaped and proportioned to engage and to grip by a suction sealing action the teat of a cow at its lower end extremity and in the immediate region of the sphincter muscle, means communicating with said suction chamber means for evacuating the air therefrom by continuous suction and causing said suction chamber means to firmly and continuously apply a radially outwardly directed force to grip the sphincter muscle region of the teat, and expansion means to effect diametrical expansion of the circular configuration of said suction chamber means.

2. The attachment of claim 1, in which said suction chamber means comprises means forming a continuous annular channel surrounding the sphincter muscle region of the teat.

3. The attachment of claim 1, in which said suction chamber means comprises a plurality of suction areas positioned to engage circumferentially spaced areas of the teat in the sphincter muscle region.

4. The attachment of claim 1, in which said suction chamber means comprises a plurality of suction elements each forming a suction pocket, and said expansion means comprises means of generally circular configuration engaging independently each of said suction elements and adjustable to change the diameter thereof.

5. The attachment of claim 4, in which said expansion means comprises a flexible member having an inner end section of circular configuration, means on said suction elements engaging said flexible member, and means for expanding the length of the inner end section of said flexible member.

6. The attachment of claim 5, in which said flexible member is secured at its inner end extremity to one of said suction elements and has an outer section slidably engaging said one suction element, and manually engageable means are provided at the outer end extremity of said flexible member for effecting slidable adjustment between said flexible member and said one suction element.

7. The attachment of claim 1, in which said expansion means comprises a suction chamber surrounding said suction chamber means and operative when evacuated to effect radial expansion of said suction chamber means.

8. The attachment of claim 7, in which said suction chamber and said suction chamber means are connected in series for substantially simultaneous evacuation.

9. The attachment of claim 7, in which said suction chamber and said suction chamber means are formed, at least in part, by a single annular member of resilient material, said annular member including an intermediate wall separating said suction chamber and said suction chamber means and forming at least part of said suction chamber means, said intermediate wall being radially expandable upon evacuation of said suction chamber to effect radial expansion of said suction chamber means.

10. The attachment of claim 9, in which said suction chamber is formed in part by a cup surrounding said annular member, said cup having means forming a bottom wall, a side wall and an inturned annular lip, and said annular member is provided with upper and lower sealing flanges engaging, respectively, said lip and side wall and said bottom wall and side wall.

11. A teat cup attachment for a milking system, comprising expandable means of generally circular configuration adapted to surround the sphincter muscle region of the teat of a cow, means for effecting a firm grip between said expandable means and the sphincter muscle region of the teat, and constantly acting means for effecting radial expansion of the expandable means to dilate the sphincter muscle.

12. The attachment of claim 11, in which said means for effecting a firm grip comprises continuous suction means.

13. The attachment of claim 11, in which the means for effecting radial expansion comprises a suction chamber and resilient means forming at least a portion of said suction chamber.

14. The attachment of claim 11, in which the means for effecting radial expansion comprises a flexible member having an inner section of generally circular configuration engaging said expandable member, and means for increasing the circumference of said inner section.

15. The attachment of claim 11, in which said expandable means comprises a resilient member of substantially H-shaped cross section, the inner wall of said resilient member forming suction chamber means for engaging the sphincter muscle region of the teat, the outer wall of said resilient member forming, at least in part, a suction chamber, and the web portion of said resilient member having passage means formed therein connecting said suction chamber and said suction chamber means.

References Cited by the Examiner

UNITED STATES PATENTS

| | | | |
|---|---|---|---|
| 204,314 | 5/78 | George | 119—14.19 X |
| 2,462,583 | 2/49 | Weiby | 119—14.47 |

FOREIGN PATENTS 128,886  8/48  Australia.

T. GRAHAM CRAVER, *Primary Examiner.*

CARL W. ROBINSON, ARNOLD RUEGG, *Examiners.*